United States Patent
Maltseff

(10) Patent No.: US 8,010,316 B2
(45) Date of Patent: Aug. 30, 2011

(54) SYSTEM AND METHOD FOR LASER RANGE-FINDING

(75) Inventor: Paul A. Maltseff, Woodinville, WA (US)

(73) Assignee: Intermec IP Corp., Everett, WA (US)

(*) Notice: Subject to any disclaimer, the term of this patent is extended or adjusted under 35 U.S.C. 154(b) by 454 days.

(21) Appl. No.: 12/333,232

(22) Filed: Dec. 11, 2008

(65) Prior Publication Data

US 2010/0153062 A1    Jun. 17, 2010

(51) Int. Cl.
*G01B 5/14* (2006.01)
*G01B 7/14* (2006.01)

(52) U.S. Cl. ....... 702/159; 356/5.05; 356/5.12; 370/289

(58) Field of Classification Search ............. 702/72, 702/75, 76, 79, 94, 95, 97, 158, 159, 176, 702/177, 178; 340/552; 342/28, 135, 198; 356/5.05, 5.12; 370/289
See application file for complete search history.

(56) References Cited

U.S. PATENT DOCUMENTS

| | | | |
|---|---|---|---|
| 2,522,267 A | 9/1950 | Hardin | |
| 3,740,141 A * | 6/1973 | DeWitt, Jr. | 356/5.12 |
| 4,682,015 A | 7/1987 | Quan | |
| 5,018,134 A * | 5/1991 | Kokubo et al. | 370/289 |
| 5,118,180 A * | 6/1992 | Wichmann et al. | 356/5.05 |
| 5,852,286 A | 12/1998 | Coleman | |
| 2009/0114727 A1 | 5/2009 | Heinrich et al. | |

OTHER PUBLICATIONS

Bosch et al. "Optical Distance Measurement," Journal of Optics A: Pure and Applied Optics 4, 2002.
Poujouly et al. "Digital laser range finder: phase-shift estimation by undersampling technique," Industrial Electronics Society, vol. 3, pp. 1312-1317, 1999.
Poujouly et al. "High-Resolution Laser rangefinder based on phase-shift measurement method," Proc. SPIE vol. 3520, pp. 123-132, 1998.
Vaughan et al. "The Theory of Bandpass Sampling," IEE Transaction on Signal Processing., vol. 39, No. 9, Sep. 1991, pp. 1973-1984.
Elisei et al. "Implementation of Multiaxial Doppler Sodar System with Advanced Data Processing," Atmospheric Research, 20, 1986, pp. 109-118.

* cited by examiner

*Primary Examiner* — John H Le
(74) *Attorney, Agent, or Firm* — Perkins Coie LLP

(57) ABSTRACT

A system and method is described for determining a distance to a desired target via correlating a pulse modulated signal with its corresponding reflected signal, while compensating for noise error in the reflected signal to allow for a more precise distance determination. The system and method determine a phase shift of an echoed signal in response to a transmitted signal incident onto an object to thereby determine a distance, wherein the system analyzes an overlap region between a second signal that is a reflection of a first signal incident on the object. The first signal is modulated by one or more pulses having a defined modulation frequency. Further details and features are described herein.

36 Claims, 6 Drawing Sheets

SYSTEM AND METHOD FOR LASER RANGE-FINDING

BACKGROUND

Laser range finders are commonly implemented based on a measurement of the round trip delay of a signal echoed by a target. For example, the round trip delay is multiplied by the speed of light (c) to determine the total back and forth distance to the target. Currently, there are various methods for determining the round trip delay. These methods may directly or indirectly determine the round trip delay.

One direct method includes measuring the time of flight (TOF) of a transmitted pulse of light. However, measuring the time of flight of a pulse requires fast electronics that limits this method to long range measurements. Some indirect methods include measuring the phase shift of a periodic signal, beat frequency of a chirped waveform, or a cross correlation of a shifted image of the transmitted signal with its echo. The indirect methods which are based on periodic signal analysis are more adapted to short or medium range distances. For example, it is possible to extract longer delays from a beat frequency determination, because the beat frequency is easier to measure using common electronics.

In the cross correlation method, the amount of phase shift of a transmitted signal that is needed to obtain the maximum correlation value represents the traveling delay of the light pulse. In other words, the round trip delay is determined by the amount the transmitted signal should to be delayed to obtain maximum correlation with its echoed signal. Such method employs a point in time comparison of a point(s) on the transmitted signal with a same point(s) on the echoed signal to determine the phase shift. The accuracy of such comparison is heavily dependant on the amount of noise contained in the echoed signal. Noise error in echoed signals are common, especially in long range transmission.

Thus, the need exists for a system and method that provide compensation for noise error in echoed signals such that more accurate phase shifts can be determined to allow accurate measurements of long distances to targets, as well as a system and method that provides additional benefits such as a simplified and cost effective system structure. Overall, the examples herein of some prior or related systems and their associated limitations are intended to be illustrative and not exclusive. Other limitations of existing or prior systems will become apparent to those of skill in the art upon reading the following Detailed Description.

Figure 1:
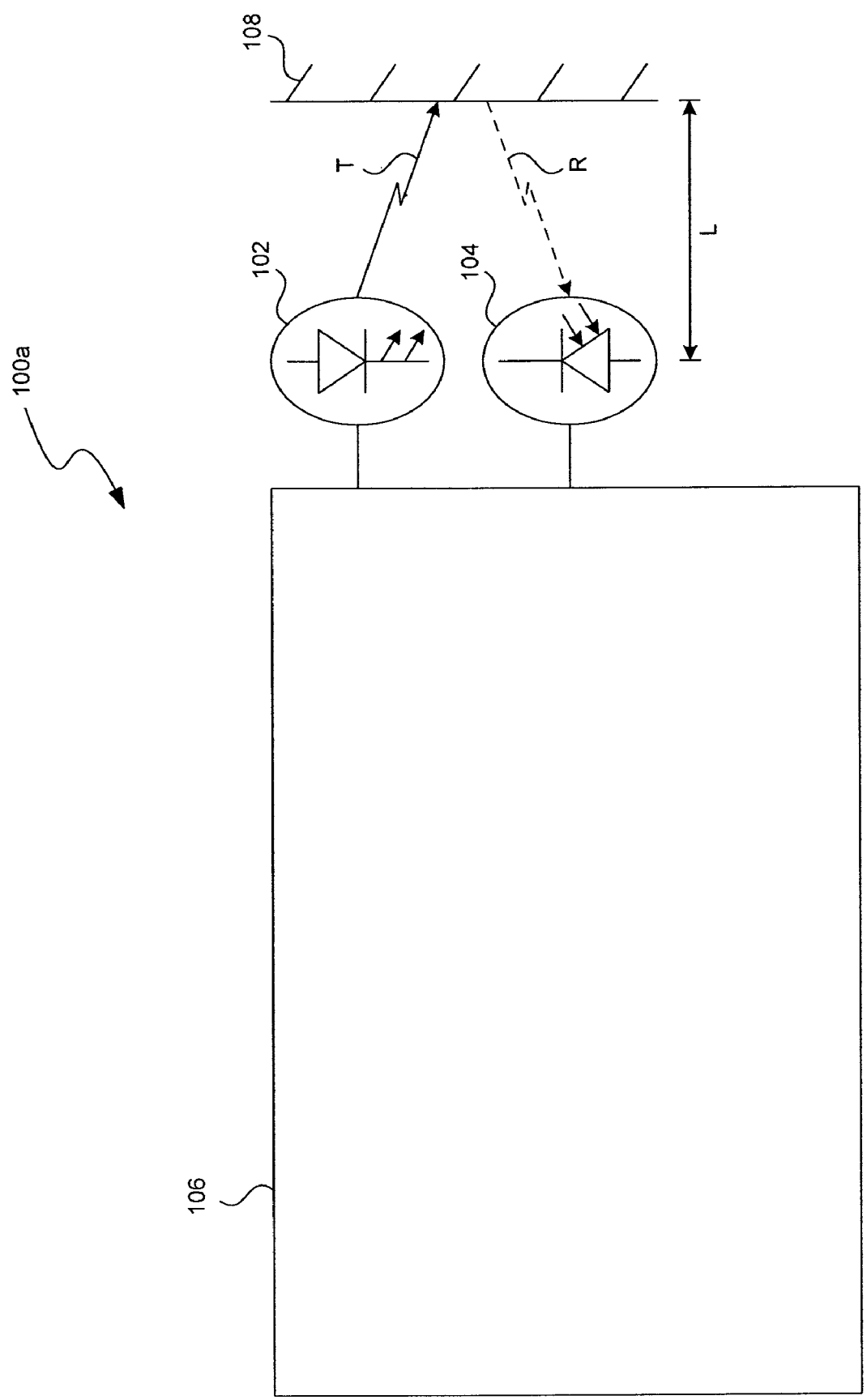
FIG. 1 is a system level schematic illustration of a system operable to implement aspects of the invention.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 202 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention incorporates many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overtly and specifically defined as such in this Detailed Description section. A "reflected" signal refers to a signal that is an echo or reflection of a transmitted signal that is incident on an object. The reflected signal may be equivalent to the transmitted signal attenuated by noise corruption and/or a reduced energy level. Additionally and/or alternatively, the reflected signal may comprise an average of first and second echoes or reflections in response to incidence of respective first and second polarizations of the transmitted signal onto the object. A "reference" signal refers to a calibrated version of the transmitted signal. The reference signal may include the transmitted signal attenuated with an amplitude that substantially matches that of the "reflected" signal. For example, the reference signal may be equivalent to the transmitted signal having an amplitude of 1.

Various formulas throughout the specification and claims make reference to $f_{sent}(t)$ and $f_{reflected}(t)$, which correspond to a function over time of the transmitted and reflected signals, respectively.

System Description

FIG. 1 and the following discussion provide a brief, general description of a suitable environment in which the invention can be implemented. Although not required, aspects of the invention are described below in the general context of computer-executable instructions, such as routines executed by a general-purpose data processing device, e.g., a networked server computer, mobile device, or personal computer.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 1 shows a schematic illustration of a system 100a for determining a distance to a target 108 via correlating a pulse modulated signal with its corresponding reflected signal. The system 100a comprises a transmitter 102, a detector 104, and a correlator 106.

The transmitter 102 may, for example, be a laser transmitter such as a laser diode, a light transmitter, or a signal generator. The laser transmitter is a device that emits light (i.e., electromagnetic radiation) through a process called stimulated emission. The light is either emitted as a narrow or low-divergence beam, or can be converted into one via optical components such as lenses. Some laser transmitters emit light with a broad spectrum, while others emit light at multiple distinct wavelengths simultaneously. The coherence of typical laser emission is distinctive. Most other light sources emit incoherent light, which has a phase that varies randomly with time and position.

The transmitter 102 is configured to transmit a signal T, for example a laser beam of light, which is modulated by a modulation component 103 (illustrated in FIG. 2), such as a pulse modulation component. The modulation component 103 modulates the transmitted signal T at a defined frequency $f_m$. The transmitted signal T is modulated by one or more pulses such as, for example, via pulse code modulation (PCM). These one or more pulses may, for example, take the form of triangular pulses, rectangular pulses, square pulses, or trapezoidal pulses. Pulse modulation (e.g. pulse code modulation) may be advantageously implemented to minimize the interference or distortion of the reflected signal over long distances.

The defined frequency of modulation $f_m$ may be determined based on an expected distance to the target 108. In other words, it is well known in the art that the distance to the target 108 of interest is provided by the following equation:

$$L = \frac{1}{2} c \frac{\Delta \varphi}{2\pi \cdot f_m},$$

where $f_m$ is the modulation frequency; $\Delta \phi$ is a phase shift of an echo of the transmitted signal; c is the speed of light (i.e., $3 \times 10^8$ m/s); and L is the distance to the target 108.

The distance L that is to be measured is limited by the pulse modulation frequency $f_m$ of the transmitted signal T. To avoid ambiguity when $\Delta \phi = 2\pi$, a condition $\Delta \phi < 2\pi$ may advantageously be satisfied. For example, for a modulation frequency $f_m$ of 30 MHz, the maximum distance L that can be measured is 5 meters. In some embodiments, the modulation frequency $f_m$ may be periodically changed according to a defined sequence. The target 108 may be any object having physical properties or characteristics that cause a signal (e.g., light or laser beam) transmitted thereon to be at least a partially reflected.

Figure 4:
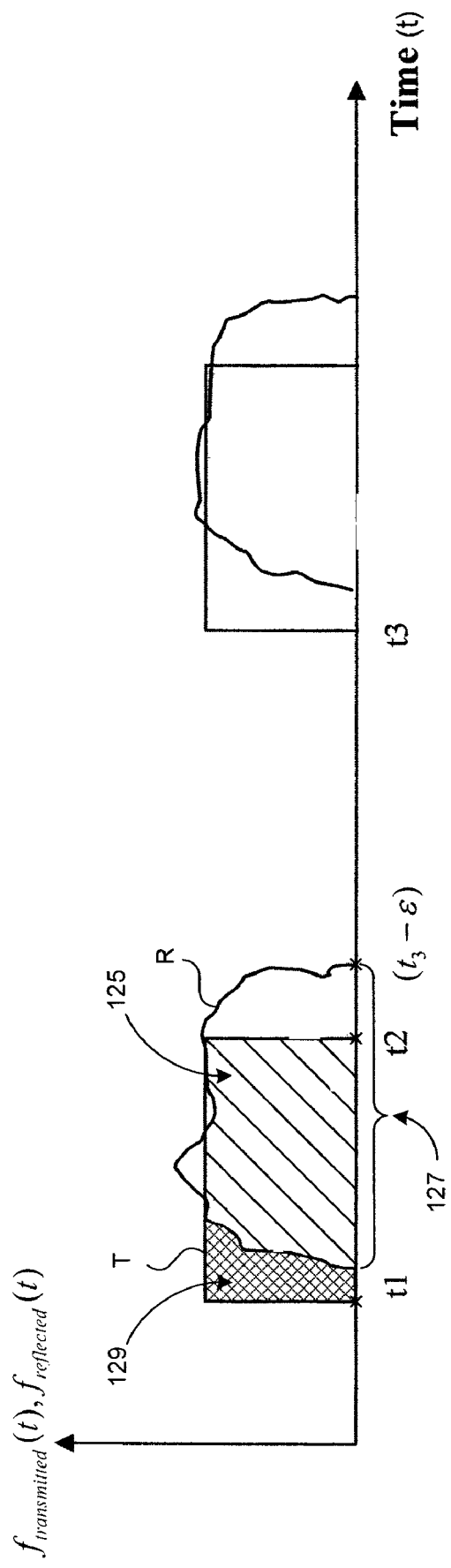
FIG. 4 is a graphical representation of the method of FIG. 3.

The transmitted signal T (illustrated in FIG. 4) is incident on the target 108 and then reflected back toward the detector 104. The reflected signal R (as illustrated in FIG. 4) may include noise error and thus may be distorted. Noise error may be due to the physical characteristics of the target 108 which affect signal reflection and/or random noise incurred during transmission/reception. Additionally, the reflected signal R may have a lower power level than the transmitted signal T due to, for example, absorption of energy by the target 108.

The detector 104 may, for example, be a light sensor or photo-detector, including a semiconductor device such as a photocell, photodiode, phototransistor, CCD (Charged Couple Device), image sensor (e.g., CMOS imager), or any other sensing device. The photo-detector may be operable to convert the reflected signal R into either current or voltage, depending upon the mode of operation. The detector 104 is communicatively coupled to the correlator 106 and is operable to receive the reflected signal R and communicate the reflected signal R to the correlator 106.

As illustrated in FIG. 1, the correlator 106 is communicatively and/or electrically coupled to both the transmitter 102 and the detector 104. For example, the correlator 106 may be coupled to the transmitter 102 and the detector 104 via wired and/or wireless connection. The correlator 106 is operable to employ a correlation (e.g., cross-correlation or convolution) of the transmitted signal T with the reflected signal R to determine a phase shift 129 (illustrated in FIG. 4) such as, for example, a time shift (or time delay). As mentioned above, the reflected signal R may have substantially less power than the transmitted signal T. In some embodiments, since the correlator 106 calculates the correlation (to be discussed in detail herein) using the transmitted signal T as a reference, the correlator 106 may perform a calibration of the transmitted signal T to advantageously match the amplitude of the reflected signal R. For example, the correlator 106 may be configured to normalize the amplitude of its received transmitted signal T to 1, thereby simplifying the calculation as will be discussed herein. The calibrated (or normalized) transmitted signal T will be referred to herein as the "reference" signal.

The correlator 106 is configured to determine: (1) a sum of mutual samples in time of the transmitted and reflected signals T, R within a respective one of the modulation pulses; and (2) a sum of samples in time within the respective one of the modulated pulses of the reflected signal R. Based on such determination, the correlator 106 can readily calculate the phase shift 129 (e.g., time shift) between the transmitted and reflected signals T, R, as will be discussed in detail below. The correlator 106 ascertains the distance L to the target 108 based on the calculated phase shift 129 (e.g., time shift) and the modulation frequency $f_m$ using the equation:

$$L = \frac{1}{2} c \frac{\Delta \varphi}{2\pi \cdot f_m},$$

where $\Delta \phi$ corresponds to the phase shift 129.

Figure 2:
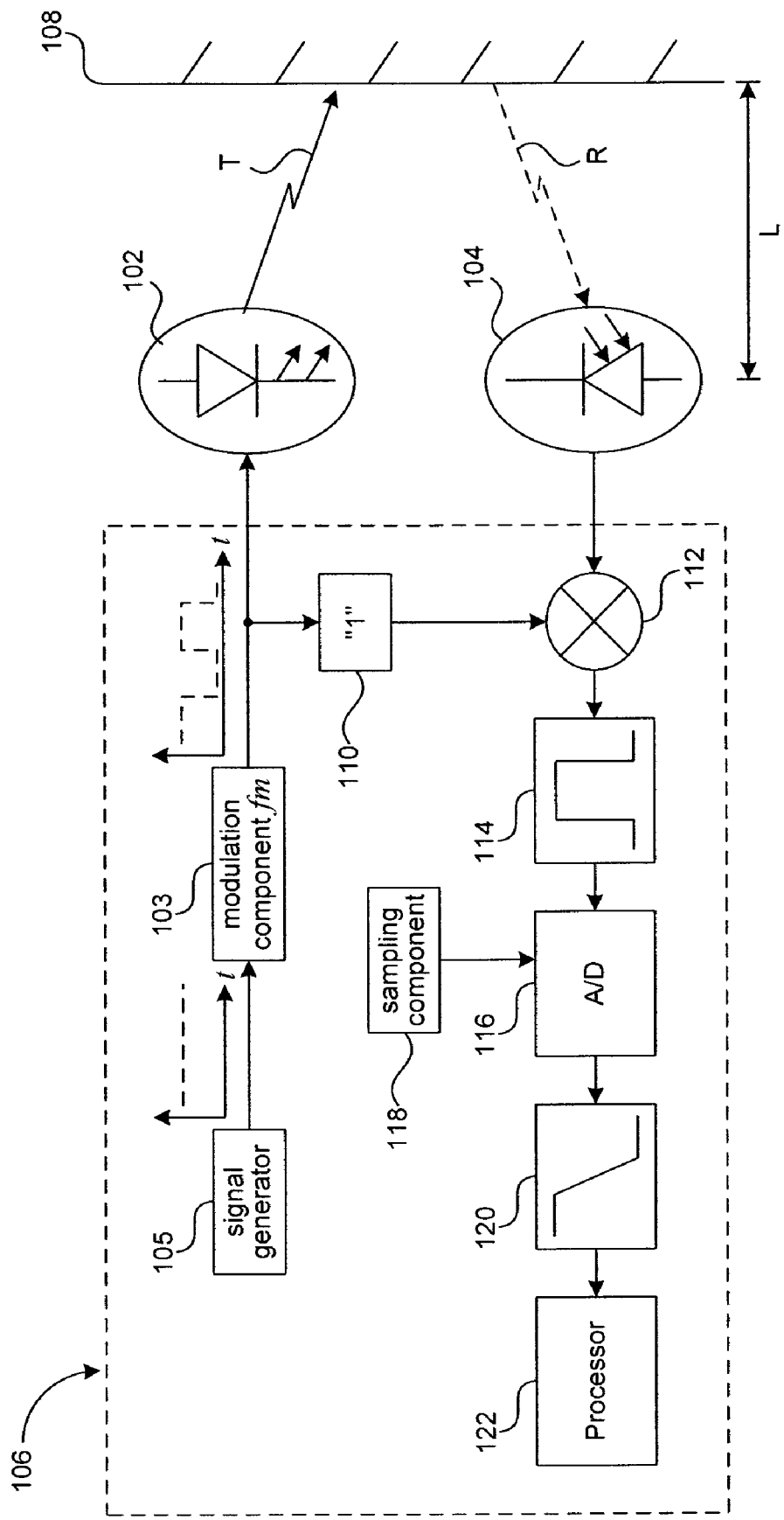
FIG. 2 is a schematic illustration of the system of FIG. 1, including a correlator used to implement aspects of the invention.

FIG. 2 shows a schematic illustration of the correlator 106, according to one illustrated embodiment. The correlator 106 may include a signal generator 105, a calibration component 110, a cross-correlator 112, a band pass filter 114, an analog-to-digital converter (ADC) 116, sampling component 118, a filter 120, and a processor 122.

The calibration component 110 may be coupled to receive the transmitted signal T from the modulation component 103 and configured to normalize the transmitted signal T, thereby creating the reference signal. The reference signal may be such that its amplitude is similar to that of the reflected signal R. For example, the calibration component 110 may normalize the transmitted signal T and create the reference signal with an amplitude of 1.

The cross-correlator 112 may be coupled to receive, as inputs, the reference signal and the reflected signal R from the calibration component 110 and the detector 104, respectively. The cross-correlator 112 may, for example, take the form of a product (or multiplying) mixer such as a Gilbert cell mixer, diode mixer, diode ring mixers (i.e., ring modulation), switching mixer, or multiplier followed by a short term integrator to sum the multiplier product over the specified short interval. A product mixer multiplies signals and produces an output including both original signals, and new signals that have the sum and difference of the frequency of the original signals. Ideal product mixers act as signal multipliers, producing an output signal equal to the product of the two input signals. Product mixers are often used in conjunction with an oscillator to modulate signal frequencies. Product mixers can either up-convert or down-convert an input signal frequency, but it is more common to down-convert to a lower frequency to allow for easier filter design. In many typical circuits, the single output signal actually contains multiple waveforms, namely those at the sum and difference of the two input frequencies and harmonic waveforms. The ideal signal may be obtained by removing the other signal components with a filter (e.g., band pass filter).

The cross-correlator 112 may multiply the reference and the reflected signals and produce an output signal comprising the product of these signals. The product of the reference and reflected signals will be referred to herein as the "product signal." The band pass filter 114 is configured to remove other signal components (e.g. waveforms) that may be included in the product signal generated by the cross-correlator 112. The band pass filter 114 may, for example, be a device or circuit that passes frequencies within a certain range and rejects (or attenuates) frequencies outside that range. Further details of cross-correlators, mixers and filters may be found in commonly assigned U.S. patent application Ser. No. 12/254,733, filed Oct. 20, 2008 and entitled "LASER BARCODE SCANNER EMPLOYING HETERODYNING TECHNIQUES," which is hereby incorporated by this reference in its entirety.

The analog-to-digital converter (ADC) 116 is coupled to receive the product signal from the band pass filter 114 and configured to convert the product signal to digital form by sampling. The sampling component 118 may define the sampling rate of the ADC 116 based on the modulation frequency $f_m$ of the modulation pulses. For example, the higher the modulation frequency, the higher the sampling rate. The sampling component 118 may be configured such that the defined sampling rate is above the nyquist rate.

Upon conversion of the product signal to the digital (or discrete) format, the digital product signal may, for example, be forwarded to the processor 122 via the additional filter 120 to remove an aliasing signal originating from the cross-correlator 112 and to determine the sum of mutual samples in time of the reflected and reference signals. Additionally, the processor 122 may receive the reflected signal R upon being digitized via the ADC 116 and passed through the filter 120. The processor 122 determines the sum of samples in time within the modulated pulse of the digitized reflected signal R. As will be described in the method of FIGS. 3-5, based on these determinations, the processor 122 measures the phase shift 129, which is ultimately used to calculate the distance L to the target 108, as defined by the equation:

$$L = \frac{1}{2} c \frac{\Delta \varphi}{2\pi \cdot f_m}.$$

The processor 122 may, for example, take the form of a microprocessor, microcontroller, application-specific integrated circuit (ASIC), or digital signal processor (DSP) configured to execute various DSP algorithms. For example, the processor 122 may be operable to execute FFT (Fast Fourier Transform) or any other digital transform algorithms to manipulate digital data received, for example, from the ADC 116. As is known in the art, the processor 122 may comprise a battery power source, a memory, a trigger, and optics. The processor 122 may be embedded within the correlator 106 (as illustrated in FIG. 2), while in other embodiments the correlator 106 may have access to the processor 122 positioned outside the correlator 106. Additionally and/or alternatively, the correlator 106 may comprise or have access to one or more processors operating in conjunction or separately.

Method Description

Figure 3:
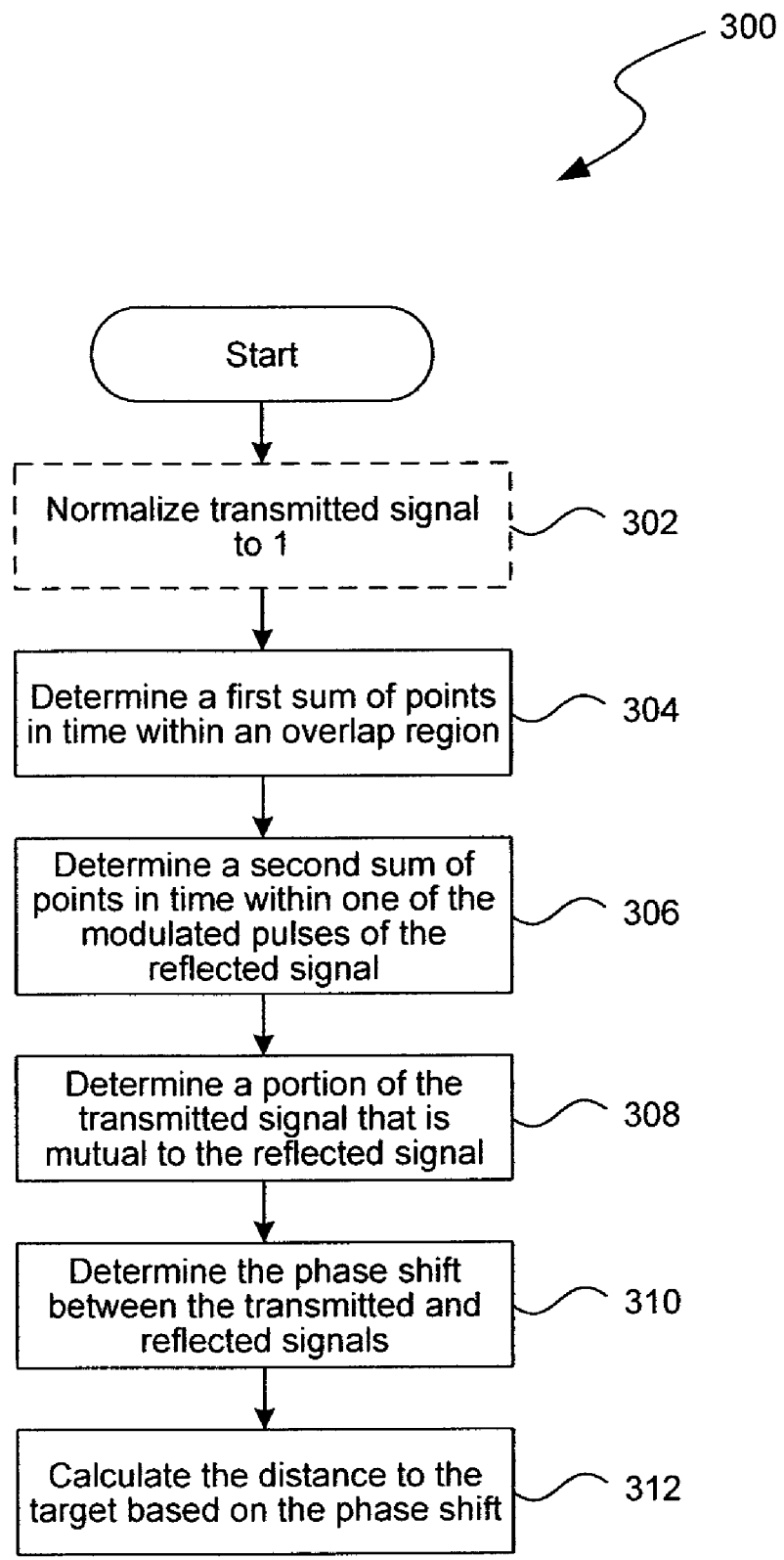
FIG. 3 is a high-level flow diagram of a method for implementing aspects of the invention.

FIG. 3 shows a high-level flow diagram of a method 300 for determining the distance L to the target 108 based on the phase shift 129 (e.g. time shift) between the transmitted signal T and the reflected signal R, according to one embodiment, while FIG. 4 shows a graphical representation of the method of FIG. 3.

Specifically, FIG. 4 graphically illustrates how the method 300 determines a fraction: (i.e., $$\frac{\int f_{sent}(t) * f_{reflected}(t) dt}{\int f_{reflected}(t) dt},$$

where $f_{sent}(t)$ and $f_{reflected}(t)$ correspond to a function over time of the transmitted and reflected signals T, R, respectively) of a total area of the transmitted signal T pulse that corresponds to the phase shift 129 by measuring a mutual area between the transmitted signal T pulse and the reflected signal R pulse. The method 300 may be implemented by the correlator 106. It will be appreciated by those skilled in the art that aspects of the correlator 106 are not limited to the embodiment illustrated in FIG. 2. Various other embodiments may be implemented to perform the method 300 described herein.

The method 300 starts, for example, in response to the correlator 106 receiving the transmitted signal T and the reflected signal R from the transmitter 102 and the detector 104, respectively.

Optionally at 302, the calibration component 110 converts the transmitted signal T into the reference signal upon normalizing the received transmitted signal T, which was transmitted to the target 108. The normalization may be such that the amplitude of the reference signal is made similar to that of the reflected signal R. For example, the transmitted signal T may be normalized to obtain a reference signal with an amplitude of 1. Such normalization may simplify the calculation of the phase shift 129, as described in the method of FIG. 5.

At 304, the correlator 106 determines a first sum of points in time within an overlap region of the transmitted and reflected signals T, R. The overlap region of these signals is the region of overlap within both of the modulated pulses. In other words, the correlator 106 calculates a sum of mutual samples in time of the transmitted and reflected signals T, R. This first sum of points may be determined by calculating an area 125 of the overlap region.

At 306, the correlator 106 determines a second sum of points in time within one of the modulated pulses of the reflected signal R. The second sum of points will be the total sum of points within the modulated pulse of the reflected signal R. The second sum of points may be determined by calculating an area 127 of the modulated pulse of the reflected signal R.

At 308, the correlator 106 determines a portion of the transmitted signal T that is overlapped by the reflected signal R (or mutual to the reflected signal R). The ratio of the first sum of points in the overlap region of the two signals to the second sum of points within the modulated pulse of the reflected signal R is calculated to determine the portion of the transmitted signal T that is mutual to the reflected signal R. In other words, the ratio of the first sum of points to the second sum of points determines the portion of the transmitted signal T that is overlapped. The determination of the portion of the transmitted signal T that is overlapped by the reflected signal R may, for example, be determined by calculating a ratio of the area 125 of the overlap region to the area 127 of the modulated pulse of the reflected signal R.

At 310, the correlator 106 determines the phase shift 129 between the transmitted and reflected signals T, R. Under ideal conditions, the reflected signal R is not corrupt with noise nor do the characteristics of the target 108 influence the reflection of the transmitted signal T. Thus, ideal conditions dictate that the reflected signal R is a perfect reflection of the transmitted signal T. In other words, identical overlap would ideally be established between the pulses of the transmitted and reflected signals T, R. Consequently, under ideal conditions, a ratio of a sum of samples in time of a pulse of the transmitted signal T to a sum of samples in time of a pulse of the reflected signal R would be equal to 1.

The correlator 106 subtracts the portion of the transmitted signal T that is mutual to the reflected signal R (calculated in step 308) from 1 (i.e., ideal circumstance of perfect overlap and no phase shift) to obtain the phase shift 129. If the time shift is desired, the phase shift 129 may be multiplied by half a time duration ($t_2-t_1$) of the respective one of the modulated pulses.

At 312, the correlator 106 calculates the distance L to the target 108 based on the phase shift 129 determined at step 310 and the modulation frequency $f_m$. The correlator 106 applies the equation:

$$L = \frac{1}{2} c \frac{\Delta \varphi}{2\pi \cdot f_m}$$

to determine the distance L to the target 108. Alternatively, if the time shift was determined in step 310, the correlator 106 applies the equation: L=c×Δt, where Δt is the time shift, to determine the distance L to the target 108.

Figure 5:
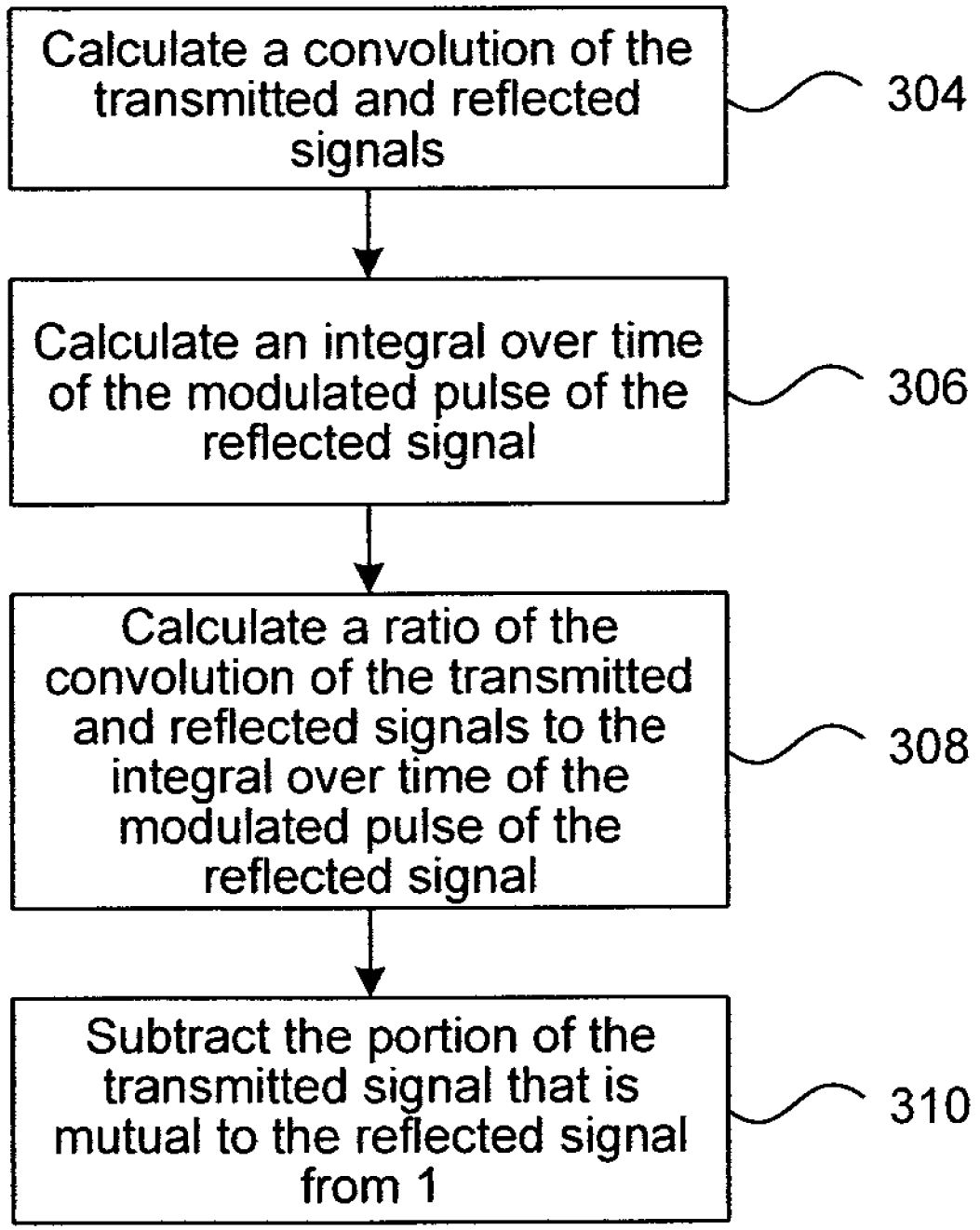
FIG. 5 is a low-level flow diagram of a portion of the method of FIG. 3.

FIG. 5 shows a low-level flow diagram of a portion of the method 300 of FIG. 3, specifically steps 304-308, according to one embodiment.

At 304, the correlator 106 determines the first sum of points in time within the overlap region of the transmitted and reflected signals T, R by calculating a convolution of the transmitted and reflected signals T, R:

$$\iint_{sent}(t) * f_{reflected}(t)dt$$

If the transmitted signal T was normalized to 1, such that $$f_{sent}(t) = \begin{cases} 1, & t_1 < t < t_2 \\ 0, & \text{else,} \end{cases}$$

the convolution of the two signals would simply be equivalent to the integral over time of the reflected signal R within the overlap region, $$\int_{t_1}^{t_2} f_{reflected}(t)dt.$$

Thus, normalizing the transmitted signal T may advantageously simplify the calculation and reduce overall processing time.

At 306, the correlator 106 determines the second sum of points in time within one of the modulated pulses of the reflected signal R by calculating an integral over time of the modulated pulse of the reflected signal R. For example, the second sum of points may be represented by: $\iint_{reflected}(t)dt$.

At 308, the correlator 106 determines a portion of the transmitted signal T that is overlapped by (or mutual to) the reflected signal R upon calculating a ratio of the convolution of the transmitted and reflected signals T, R to the integral over time of the modulated pulse of the reflected signal R:

$$\frac{\int f_{sent}(t) * f_{reflected}(t)dt}{\int f_{reflected}(t)dt}$$

If, for example, the transmitted signal T is normalized to 1, the portion of the transmitted signal T that is overlapped by (or mutual to) the reflected signal R is calculated by a simplified equation of:

$$\frac{\int_{t_1}^{t_2} f_{reflected}(t)dt}{\int_{t_1}^{t_3-\varepsilon} f_{reflected}(t)dt}.$$

At 310, the correlator 106 determines the phase shift 129 between the transmitted and reflected signals T, R. As discussed above, under ideal conditions, there is identical overlap between the modulated pulses of the transmitted and reflected signals T, R, and no phase shift arises. Consequently, under ideal conditions, a ratio of an integral over time within an overlap region of the transmitted and reflected signals T, R to an integral over time of a modulated pulse of the reflected signal R would yield a value of 1.

If the transmitted and, therefore, received signals T, R are rectangular, the above ratio is a linear function of the distance L to the target 108. However, in some embodiments, for example, the transmitted signal T could be a sine or Gaussian Monocycle; therefore, it may be advantageous to calibrate the correlator 106 and create a look-up-table (LUT) for specific ratio values corresponding to particular phase shifts 129. For example, the correlator 106 may access the LUT to determine the phase shift 129 corresponding to the specific ratio value (i.e., the portion of the transmitted signal T that is overlapped by (or mutual to) the reflected signal R) calculated at 308.

The correlator 106 subtracts the portion of the transmitted signal T that is mutual to the reflected signal R (calculated in step 308) from 1 (i.e., ideal circumstance of perfect overlap and no phase shift), to obtain the phase shift 129. If the time shift is desired, the phase shift 129 may be multiplied by half the time duration ($t_2-t_1$) of the respective one of the modulated pulses.

Alternative System Description

Figure 6:
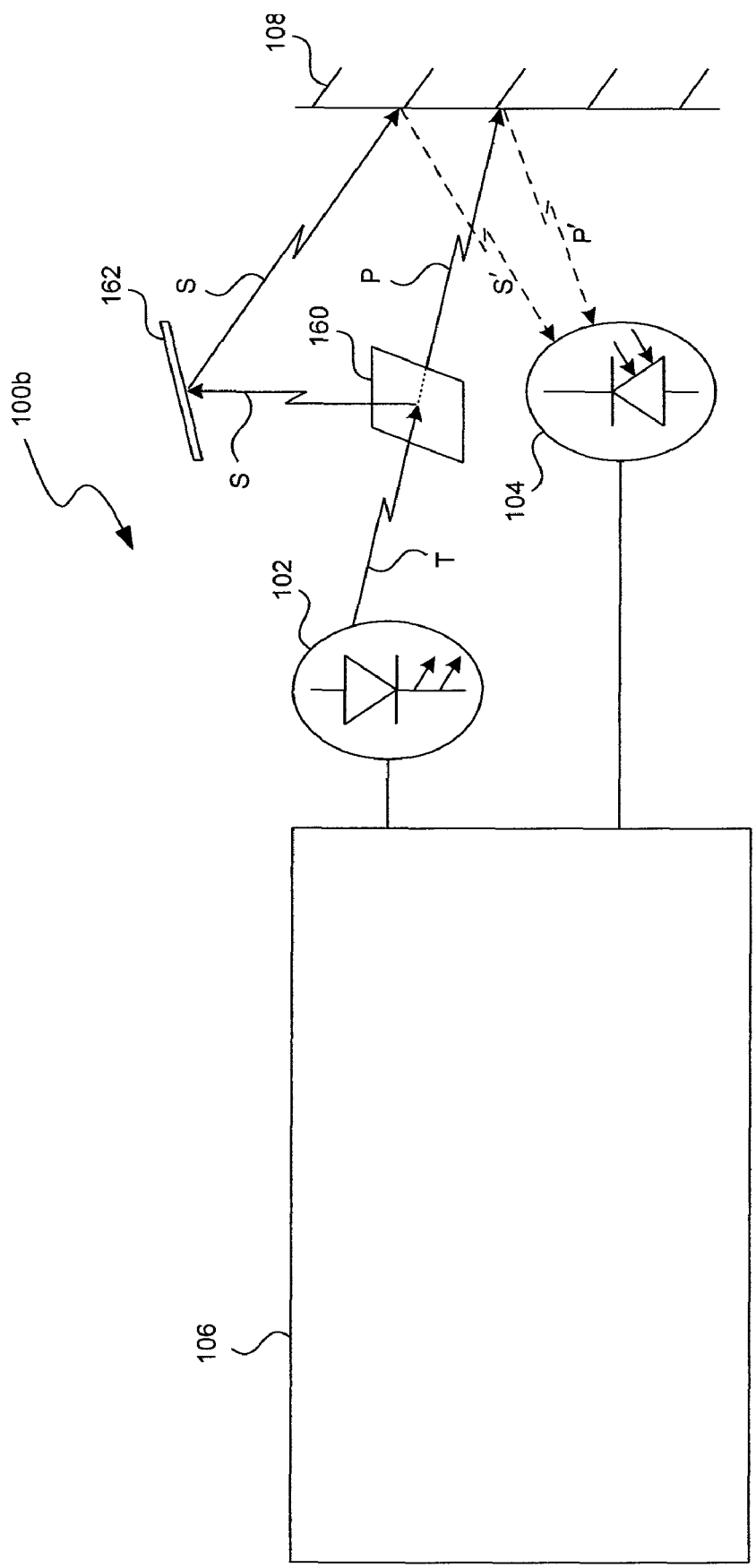
FIG. 6 is a schematic illustration of a system incorporating a polarizing splitter to implement aspects of the invention.

FIG. 6 shows a system 100b for determining the distance to the target 108 based on phase shifts (e.g. time shift) associated with a first and a second polarization of the transmitted signal T.

A polarizing splitter 160, such as a beam splitter (e.g., laser beam splitter) may be positioned in the path of the transmitted signal T (e.g. laser beam) prior to incidence on the target 108. The polarizing splitter 600 may split the transmitted signal T into first and second signals p, s, respectively, having different polarizations. A signal (e.g., light beam) polarized in a plane of incidence is referred to as being p-polarized, while a signal (e.g., light beam) polarized perpendicular to the plane of incidence is referred to as s-polarized. In our case, the first and second polarized signals p, s, are p-polarized and s-polarized, respectively. The polarization of the first and second signals p, s may be symmetrical or non-symmetrical. For example, polarization of the first and second signals p, s may be at least one of orthogonal, linear, circular, and elliptical polarization (e.g., ⅓ and ⅔ polarization, respectively).

Additionally, a mirror 162 or similar reflective component or surface having minimal absorption characteristics, may be implemented in the system 100b to advantageously reflect the second signal s (s-polarization) in the direction of the plane of incidence. The mirror 162 allows for incidence of the second signal s onto the target 108 in addition to the first signal p (p-polarization). In response to incidence of the first and second signals p, s on the target 108, first and second reflected signals p', s' are generated. It is well known in the art that two signals having different polarization will be reflected differently. For example, the first reflected signal p' may have less noise error than the second reflected signal s'.

The detector 104 is configured to detect the first and second reflected signals p', s' and forward to the correlator 106 for processing. The correlator 106 averages the first and second reflected signal p', s'. The correlator 106 may, for example, average the weighted coefficients of the first and second reflected signal p', s' to determine the reflected signal R of FIGS. 1-5, which is used to calculate the phase shift 129 (or time shift) and ultimately the distance L to the target 108. Such averaging of the first and second reflected signals p', s' provides additional compensation for potential noise error produced by the first and second reflected signals p', s' and thus advantageously provides a more accurate determination of the distance L to the target 108.

It will be understood by those skilled in the art that once the first and second reflected signal p', s' are averaged to determine the reflected signal R, the system 100b may implement the methods 300, 500 of FIGS. 3 and 5, and various acts described with regard to the system 100a components.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while aspects of the invention are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A method for determining a phase shift of an echoed signal in response to a transmitted signal incident onto an object, the method comprising:
   receiving a second signal, the second signal being a reflection of a first signal incident on the object,
      wherein the first signal is modulated by one or more pulses having a defined modulation frequency;
   using a processor for determining a first sum of points in time within an overlap region of the first and second signals,
      wherein the overlap region includes a portion of both respective pulses of the first and second signals;

determining a second sum of points in time within the respective one of the pulses of the second signal; and determining a fraction of the first signal that is overlapped by the second signal upon dividing the first sum of points in time by the second sum of points, wherein the phase shift of the second signal is provided upon subtracting the determined fraction of the first signal from a selected value.

2. The method of claim 1, further comprising modulating the first signal with at least one of triangular pulses, rectangular pulses, square pulses, Gaussian Monocycle, sine pulses, trapezoidal pulses, or any other distinct repeatable signal.

3. The method of claim 1, further comprising modulating the first signal with the defined modulation frequency determined based at least in part on an expected distance to the object.

4. The method of claim 1 wherein determining the first sum of points in time includes calculating a convolution of the first and second signals.

5. The method of claim 4 wherein determining the first sum of points in time includes calculating $\iint f_{sent}(t) * f_{reflected}(t)dt$, where and $f_{sent}(t)$ and $f_{reflected}(t)$ correspond to functions over time of the first and second signals, respectively.

6. The method of claim 1 wherein determining the second sum of points in time includes calculating an integral in time of the respective one of the pulses of the second signal.

7. The method of claim 6 wherein determining the second sum of points in time includes calculating $\iint f_{reflected}(t)dt$, where $f_{reflected}$ corresponds to a function over time of the second signal.

8. The method of claim 1, further comprising normalizing the first signal to 1 such that the first sum of points in time is equivalent to an integral over time of the second signal within the overlap region.

9. The method of claim 1 wherein determining the fraction of the first signal that is overlapped by the second signal includes calculating $$\frac{\int f_{sent}(t) * f_{reflected}(t)dt}{\int f_{reflected}(t)dt},$$

where $f_{sent}$ and $f_{reflected}$ correspond to functions over time of the first and second signals, respectively.

10. The method of claim 1 wherein subtracting the determined fraction of the first signal from the selected value includes subtracting the determined fraction from 1.

11. The method of claim 1, further comprising transmitting the first signal onto the object by splitting the first signal into first and second polarizations that respectively incident onto the object.

12. The method of claim 11 wherein receiving the second signal comprises:

receiving a first reflected signal, in response to the first polarization of the first signal incident onto the object;

receiving a second reflected signal, in response to the second polarization of the first signal incident on the object; and averaging the received first and second reflected signals.

13. The method of claim 12 wherein averaging the received first and second reflected signals includes averaging weighted coefficients of the first and second reflected signals.

14. The method of claim 11 wherein splitting the first signal into the first and second polarizations includes polarizing the first signal with at least one of linear, circular, and elliptical polarization.

15. The method of claim 11 wherein splitting the first signal into the first and second polarizations includes splitting the first signal into a ⅓ polarization and a ⅔ polarization.

16. The method of claim 1, further comprising:

determining a time shift of the second signal in response to multiplying the phase shift by half a time duration of a respective one of the modulated pulses of the first signal; and calculating a distance to the object upon multiplying the time shift by a speed of light.

17. A system to determine a phase shift of an echoed signal in response to a transmitted signal incident onto an object, the system comprising:

a detecting element configured to receive a reflected signal corresponding to a reflection of the transmitted signal incident on the object, wherein the transmitted signal is modulated by one or more pulses having a defined modulation frequency; and a correlator coupled to receive the transmitted signal and the reflected signal, wherein the correlator is configured to:

determine a fraction of the transmitted signal that is overlapped by the reflected signal, in response to dividing a first sum of mutual points in time, between the transmitted signal and the reflected signal, by a second sum of points in time within a respective pulse of the reflected signal, and determine a phase shift of the reflected signal in response to subtracting the determined fraction of the transmitted signal from a selected value.

18. The system of claim 17 wherein the transmitted signal is a light beam transmitted by a laser diode.

19. The system of claim 17 wherein the detecting element is at least one of a photocell, photodiode, phototransistor, CCD (Charged Coupled Device), and image sensor.

20. The system of claim 17 wherein the defined modulation frequency is periodically changed based on a defined sequence.

21. The system of claim 17 wherein the correlator determines the first sum of mutual points in time in response to calculating a convolution of the transmitted and reflected signals.

22. The system of claim 21 wherein the first sum of mutual points in time is determined by $\iint f_{scent}(t) * f_{reflected}(t)dt$, where $f_{sent}$ and $f_{reflected}$ correspond to functions over time of the transmitted and reflected signals, respectively.

23. The system of claim 22 wherein the transmitted signal received by the correlator is normalized to 1 such that the first sum of mutual points in time is provided by $$\int_{t_1}^{t_2} f_{reflected}(t)dt,$$

where $f_{reflected}$ corresponds to a function over time of the reflected signal.

24. The system of claim 17 wherein the correlator determines the second sum of points in time by calculating an integral in time of a respective one of the reflected signal pulses.

25. The system of claim 24 wherein the second sum of points in time is determined by calculating $\iint f_{reflected}(t)dt$, where $f_{reflected}$ corresponds to a function over time of the reflected signal.

26. The system of claim 17 wherein the selected value is 1.

27. The system of claim 17, further comprising a polarizing splitter configured to split the transmitted signal into first and second polarized signals having different polarizations.

28. The system of claim 27 wherein the polarization of the first and second polarized signals is non-symmetrical.

29. The system of claim 27 wherein the first and second polarized signals are p-polarized and s-polarized, respectively.

30. The system of claim 27 wherein the reflected signal received by the correlator comprises:
 a first reflected signal, in response to the first polarized signal incident on the object; and
 a second reflected signal, in response to the second polarized signal incident on the object.

31. The system of claim 30 wherein the correlator determines an average of the first and second reflected signals upon averaging weighted coefficients of the first and second reflected signals.

32. The system of claim 17 wherein the correlator is configured to:
 determine a time shift of the reflected signal in response to multiplying the phase shift by half a time duration of a respective one of the modulating pulses of the transmitted signal; and
 calculate a distance to the object upon multiplying the time shift by a speed of light.

33. A method for determining a phase shift of an echoed signal while compensating for noise error in the echoed signal, the method comprising:
 receiving a reflected signal corresponding to a reflection of a transmitted signal incident on an object, wherein the transmitted signal is modulated by one or more pulses;
 using a processor for determining a fraction of an area of the transmitted signal that is common to both the reflected and transmitted signals over a defined interval of time in response to dividing a mutual area of the transmitted and reflected signals over the defined interval of time by a total area of the reflected signal over the defined interval of time; and
 determining a phase shift of the reflected signal relative the transmitted signal in response to subtracting the determined fraction of the area of the transmitted signal that is common to both the reflected and transmitted signals from a selected value.

34. The method of claim 33 wherein determining the fraction of the area of the transmitted signal includes convolving the transmitted and reflected signals.

35. The method of claim 33 wherein the selected value is representative of an ideal reflection.

36. The method of claim 33, further comprises:
 determining a time of flight (TOF) of the transmitted signal in response to multiplying the phase shift by a time interval of a respective one of the modulated pulses; and
 determining a distance to the object in response to multiplying half the time of flight by a speed of the transmitted signal.

* * * * *

UNITED STATES PATENT AND TRADEMARK OFFICE
CERTIFICATE OF CORRECTION

PATENT NO. : 8,010,316 B2
APPLICATION NO. : 12/333232
DATED : August 30, 2011
INVENTOR(S) : Paul A. Maltseff It is certified that error appears in the above-identified patent and that said Letters Patent is hereby corrected as shown below:

In column 1, line 35, delete "dependant" and insert -- dependent --, therefor.

In column 12, line 45, in claim 22, delete " $\iint_{scent}(t) * f_{reflected}(t) dt,$ " and insert -- $\int f_{sent}(t) * f_{reflected}(t) dt,$ --, therefor.

Signed and Sealed this
Twenty-eighth Day of February, 2012

David J. Kappos
*Director of the United States Patent and Trademark Office*